(12) United States Patent
Richter et al.

(10) Patent No.: US 10,859,316 B1
(45) Date of Patent: Dec. 8, 2020

(54) PREDICTIVE REFRACTORY PERFORMANCE MEASUREMENT SYSTEM

(71) Applicant: HarbisonWalker International, Inc., Moon Township, PA (US)

(72) Inventors: Tomas Richter, Wexford, PA (US); Corey Forster, Carnegie, PA (US); Donald Abrino, Curwensville, PA (US)

(73) Assignee: HarbisonWalker International, Inc., Moon Township, PA (US)

( * ) Notice: Subject to any disclaimer, the term of this patent is extended or adjusted under 35 U.S.C. 154(b) by 0 days.

(21) Appl. No.: 16/583,377

(22) Filed: Sep. 26, 2019

(51) Int. Cl.
*G01J 5/60* (2006.01)
*F27D 21/00* (2006.01)
(Continued)

(52) U.S. Cl.
CPC .......... *F27D 21/0021* (2013.01); *C21C 5/445* (2013.01); *F27D 1/1678* (2013.01);
(Continued)

(58) Field of Classification Search
CPC ...... F27D 21/0021; F27D 1/16; F27D 1/1678; F27D 2021/005; F27D 27/00;
(Continued)

(56) References Cited

U.S. PATENT DOCUMENTS 5,000,580 A * 3/1991 Leininger ............. G01J 5/0014
356/44
5,125,745 A * 6/1992 Neiheisel ................ C21C 5/441
356/602
(Continued)

FOREIGN PATENT DOCUMENTS

CN 108871210 A 3/2018
CN 208076265 U 4/2018
(Continued)

OTHER PUBLICATIONS

Viertauer et al, "Refractory Condition Monitoring and Lifetime Prognosis for RH Degasser," Proceedings of the Association for Iron & Steel Technology Conference, Pittsburgh, Pennsylvania, May 6-9, 2019, pp. 1081-1089.

Lammer, G., "Advanced Data Mining for Process Optimizations and Use of AI to Predict Refractory Wear and to Analyze Refractory Behavior," AISTech 2017 Proceedings, 2017, pp. 1195, 1197, 1199, 1201, 1203, 1205, 1207.
(Continued)

*Primary Examiner* — Hoa Q Pham
(74) *Attorney, Agent, or Firm* — Kusner & Jaffe

(57) ABSTRACT

A measurement system is provided for predicting a future status of a refractory lining that is lined over an inner surface of an outer wall of a metallurgical vessel and exposed to a heat during which the refractory lining is exposed to molten metal. The system includes one or more laser scanners and a processor. The laser scanners are configured to conduct a plurality of laser scans of the refractory lining when the metallurgical vessel is empty. At least one of the laser scanners is configured to laser scan the refractory lining prior to the heat to collect data related to pre-heat structural conditions of the refractory lining. At least one of the laser scanners is configured to laser scan the refractory lining after the heat to collect data related to post-heat structural conditions of the refractory lining. The processor is configured to predict the future status of the lining.

26 Claims, 3 Drawing Sheets

(51) Int. Cl.
*C21C 5/44* (2006.01)
*G01B 11/00* (2006.01)
*G01B 21/08* (2006.01)
*F27D 1/16* (2006.01)
*F27D 1/00* (2006.01)

(52) U.S. Cl.
CPC ........ *F27D 21/0014* (2013.01); *G01B 11/005* (2013.01); *G01B 21/08* (2013.01); *C21C 2005/448* (2013.01); *F27D 2001/0056* (2013.01)

(58) Field of Classification Search
CPC ....... F27D 21/0014; C21C 5/441; C21C 5/44; C21C 2005/448; G01N 21/954; G01B 11/24; G01B 11/06; G01B 21/08
USPC .............. 356/44–45, 237.1–237.5, 600–632; 266/99–100; 348/83, 135
See application file for complete search history.

(56) References Cited

U.S. PATENT DOCUMENTS

| | | | |
|---|---|---|---|
| 5,212,738 A * | 5/1993 | Chande | C21C 5/441 348/135 |
| 5,546,176 A * | 8/1996 | Jokinen | C21C 5/441 356/139.03 |
| 6,922,251 B1 | 7/2005 | Kirchhoff et al. | |
| 6,922,252 B2 | 7/2005 | Harvill et al. | |
| 7,924,438 B2 | 4/2011 | Kleinloh et al. | |
| 8,072,613 B2 | 12/2011 | Schmitz et al. | |
| 8,958,058 B2 | 2/2015 | Bonin et al. | |
| 9,017,435 B2 * | 4/2015 | Leininger | G05D 11/135 48/76 |
| 9,279,773 B2 | 3/2016 | Harvill | |
| 10,060,725 B2 | 8/2018 | Bonin et al. | |
| 10,175,040 B2 | 1/2019 | Bonin et al. | |
| 2005/0263945 A1 | 12/2005 | Kirchhoff et al. | |
| 2016/0273907 A1 | 9/2016 | Bonin et al. | |
| 2016/0282049 A1 * | 9/2016 | Lammer | F27D 1/1642 |
| 2018/0347907 A1 | 12/2018 | Lammer et al. | |
| 2020/0072554 A1 * | 3/2020 | Picco | F27D 21/0014 |

FOREIGN PATENT DOCUMENTS

| | | |
|---|---|---|
| WO | WO-2016/153643 A1 | 9/2016 |
| WO | WO-2018/109510 A1 | 6/2018 |
| WO | WO-2018/141809 A1 | 8/2018 |

OTHER PUBLICATIONS

Forrer, M., "Prediction of refractory wear with Machine Learning methods," Institute for Theoretical Computer Science (IGI), Graz University of Technology, Mar. 12, 2012.

* cited by examiner

PREDICTIVE REFRACTORY PERFORMANCE MEASUREMENT SYSTEM

FIELD OF THE INVENTION

The present invention relates generally to refractory analysis and, more specifically, a system and method for predicting refractory performance.

BACKGROUND OF THE INVENTION

Industrial processes, such as production of steel, are supported by ever-increasing collections of process data and parameters. Many statistical, analytical, and data manipulation solutions can be used to quickly and efficiently analyze process data with the aim of process optimization and improved efficiencies. Process optimization systems, composed of computing system hardware and software, collect the raw process data and correlate the raw process data with changes, modifications, or upgrades to the process. The systems are capable of time stamping and correlating various collected data. In advanced formats, the systems are also capable of analytical and statistical correlations of multiple and interdependent parameters. Using these correlations, the systems can describe the influences on the process efficiencies. Many of the collected process parameters, individually or in correlations, directly influence the performance of the refractory linings.

Such systems, as described above, are used in processes making liquid steel in primary melting units, such as basic oxygen furnaces and electric arc furnaces. The systems can also be used with processes in secondary refining and transport vessels, such as steel ladles, degassers, argon oxygen decarburization, vacuum oxygen decarburization furnaces, or similar. Vessels that contain liquid steel must contain linings constructed from high temperature refractory materials resistant to liquid steel and molten slags. Even so, both liquid steel and molten slags serve to corrode the refractory linings.

The level and the progression of the refractory lining corrosion are conventionally measured by three widely accepted and currently employed methods: visual observation, infrared mapping, and laser scanning. Visual observation of refractory lining corrosion can be performed during servicing of the refractory linings. Visual observation of refractory lining corrosion can also be performed by physical measurement of the refractory lining remnants after completion of the useful life of the refractory lining.

Infrared mapping of refractory lining corrosion is performed on the outside surfaces of the lining-equipped vessels that are loaded with liquid steel at a specific step or time of the liquid steel contact phase. The purpose of infrared mapping of refractory lining corrosion is to correlate the temperature of the outside surfaces of the loaded vessels with the conditions of the refractory linings installed in the vessels. Infrared mapping can be as simple as a visual review of infrared mapping images. Visual review of infrared mapping images can be additionally complemented with software manipulations, advanced temperature imagery, and data reports.

Laser scanning of refractory lining corrosion is performed on inside surfaces of empty, lining-equipped vessels at a specific process location. The laser scanning systems can utilize multiple types of hardware and devices therein, including, but not limited to, laser time-of-flight cameras. A software package capable of processing point cloud data into fully geometrically descriptive images and generating various data reports can be used to analyze the data collected from the laser scanning. The purpose of the method is to measure, within an accuracy of 2 mm, an actual geometry, a remaining thickness, or other detailed parameters of the refractory lining. Such parameters may include, but are not limited to, a condition of functional parts of the ladle, such as a well block or a taphole, or a sanding efficiency of the well blocks or tapholes, or measure a steel yield trapped in the depressions of the bottom of the ladle, or conditions of the passages of the flow control components, which may include, but are not limited to, slide gates.

Conventionally, the three methods described above are utilized independently of each other. The refractory lining corrosion is primarily identified in industrial processes by visual observation. However, infrared mapping and laser scanning are considered alternate and independent solutions for refractory linings corrosion evaluation. In fact, the three methods compete in the marketplace at significantly diverging costs. The costs of visual observation are largely related to overhead. Infrared mapping systems are less costly than laser scanning systems.

However, the use of the methods individually may have drawbacks in certain situations. For example, very infrequent visual observation of refractory lining corrosion does not collaborate with actual conditions of the refractory linings physically described using laser scanning after each heat or process cycle, or, to a lesser extent, infrared mapping. Further, visual observation does not allow for the collection of valuable process optimization data that can be used to calculate predictive performance of the refractory lining.

Infrared mapping of refractory lining corrosion is indirect and judges the conditions of the refractory lining by observation of the outside surfaces. The temperature readings collected by the infrared mapping method are influenced by the flow of heat thru the actual thickness of the lining. However, adversely, the temperature readings are also influenced by the temperature of the liquid steel or impregnation of the lining voids by liquid steel and molten slags. Such liquid steel impregnations are common and could generate false readings using infrared mapping, thereby leading to a premature replacement of a refractory lining at a significant cost.

Laser scanning of refractory lining corrosion is direct and measures the actual conditions and thickness of the refractory lining with high precision. However, laser scanning is incapable of measuring the thickness and conditions of the refractory lining if the refractory lining is coated by slags at the time of measurement. In other words, liquid steel or molten slags cannot be present within the ladle if accurate results from laser scanning are to be desired. If a significant flaw in the lining, such as a large crack or insufficient thickness, were covered by the temporary slag coating, the laser scan would generate false reports. The coating could then melt away during operation, thereby exposing the hidden refractory lining flaw to liquid steel. This could lead to a catastrophic breach of the refractory lining.

The present invention has been developed to address these and other issues by providing a system by which refractory lining corrosion is identified through both laser scanning and infrared mapping. In addition, the present invention provides a system in which process characteristics and variables can be used in addition to the data retrieved by laser scanning and infrared mapping to predict the future performance of the refractory lining in question.

SUMMARY OF THE INVENTION

In accordance with an embodiment of the present invention, there is provided a measurement system for predicting a future status of a refractory lining that is lined over an inner surface of an outer wall of a metallurgical vessel and exposed to a heat during which the refractory lining is exposed to molten metal. The system includes one or more laser scanners and a processor. The laser scanners are configured to conduct a plurality of laser scans of the refractory lining when the metallurgical vessel is empty. At least one of the laser scanners is configured to laser scan the refractory lining prior to the heat to collect data related to pre-heat structural conditions of the refractory lining. At least one of the laser scanners is configured to laser scan the refractory lining after the heat to collect data related to post-heat structural conditions of the refractory lining. The processor is configured to determine an exposure impact of the heat on the refractory lining by comparing the collected pre-heat structural condition data with the collected post-heat structural condition data. The processor is further configured to predict the future status of the refractory lining after one or more subsequent heats based on the determined exposure impact of the heat.

In accordance with another embodiment of the present invention, there is provided a method of predicting a future status of a refractory lining that is lined over an inner surface of an outer wall of a metallurgical vessel and exposed to a heat during which the refractory lining is exposed to molten metal. The method includes conducting one or more laser scans of the refractory lining prior to the heat. The conducting of the laser scans prior to the heat includes the collecting of data related to pre-heat structural conditions of the refractory lining. The method further includes conducting one or more laser scans of the refractory lining after the heat. The conducting of the laser scans after the heat includes the collecting of data related to post-heat structural conditions of the refractory lining. The method also includes determining, via a processor, an exposure impact of the heat on the refractory lining. The determining of the exposure impact includes comparing the collected pre-heat structural condition data with the collected post-heat structural condition data. The method additionally includes predicting, via the processor, the future status of the refractory lining after one or more subsequent heats based on the determining of the exposure impact of the heat.

The present invention provides a solution for the flaws associated with false temperature readings obtained by infrared mapping due to steel impregnation.

The present invention further provides a solution for the flaws in false laser scanning readings influenced by slag coatings.

The present invention additionally provides a solution that allows for very precise refractory lining measurement of a metallurgical vessel when empty, as well as refractory lining monitoring while the vessel is full of molten metal or molten steel.

The present invention still additionally provides a solution that significantly improves the safety of the operation of refractory-lined metallurgical vessels.

Moreover, the present invention allows for the development of statistical algorithms for predictive metallurgical vessel performance calculations.

In addition, the present invention provides for a solution that would allow the influence of operational and predetermined parameters to be confirmed using actual readings of the refractory lining conditions, where such readings could be collected after each cycle.

These and other advantages will become apparent from the following description of a preferred embodiment taken together with the accompanying drawings and claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
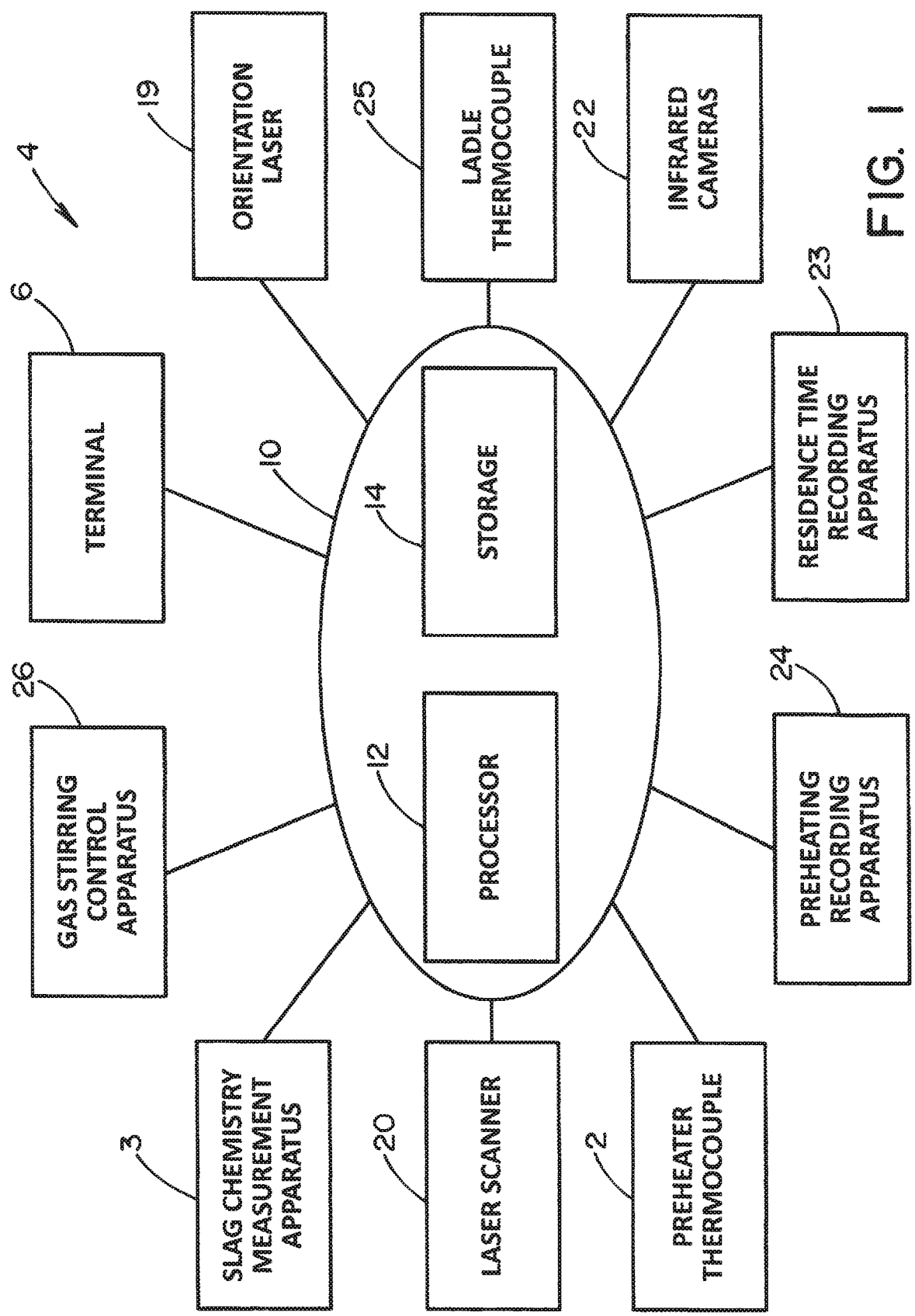
FIG. 1 is a schematic view illustrating an example predictive refractory performance measurement system of the present invention.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. In addition, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Initially, for purposes of the discussion herein, "metallurgical vessel" refers to any container that can be used within the process for the production or refining of molten steel. This includes, but is not limited to, a primary melting unit or second metallurgical vessels. A primary melting unit includes, but is not limited to, a basic oxygen furnace or an electric arc furnace. Secondary metallurgical vessels include, but are not limited to, a ladle metallurgical furnace, a degasser, an argon oxygen decarburization vessel, or a vacuum oxygen decarburization vessel. An example of a secondary steelmaking or metallurgical vessel that is tasked with carrying molten steel is empty ladle vessel 16 and full ladle vessel 18, which will be described in more detail in the discussion below. However, embodiments described herein are not limited thereto, as the use of a metallurgical vessel is not limited to use with molten steel, but also can hold other molten metals in general.

Further, steel mill operational parameters that influence the performance of refractory linings in metallurgical vessels will be described along with, if applicable, the variability and the measuring methods thereof. For example, for purposes of the discussion herein, a "heat" may refer to one performance of a steel-making process from beginning to end.

For example, for purposes of the discussion herein, "scrap or charging mix" could include batches with specific proportions of individual scrap qualities and iron units for the grade of steel to be produced, including, but not limited to, ferrous scrap identified by guidelines from the Institute of Scrap Recycling Industries, which additionally may include, but is not limited to, heavy melting steel, busheling, clippings, bundles, shreddings, turnings, plates, structures, cast iron, mixed heavy melt, rails, railroad, and can bales, and could be complemented by other sources of iron units, such as, but not limited to, pig iron and hot briquetted iron.

With respect to scrap or charging mix, there is a large variability of steel scrap qualities and iron units available for the steelmaker to utilize in his primary melting process. Physical attributes of these materials, such as size, shape, and contaminations, chemical attributes of these materials, such as composition, rust, and impurities, and a composition of a charging mix for each heat, have direct impact on the efficiency of the melting process, the duration of the refining metallurgy and the corrosion and erosion of the refractories. The charging mix is typically a simple batching instruction with specific proportions of individual scrap qualities and iron units. These instructions are based on the availability of charging components and grade of steel to be produced.

Moreover, for purposes of the discussion herein, "steel" and grades thereof could include, but are not limited to, carbon steels, nickel steels, nickel-chromium steels, molybdenum steels, chromium steels, chromium-vanadium steels, tungsten steels, nickel-chromium-molybdenum steels, and silicon-manganese steels. Further, each grade of steel requires some alternation in the processing of the steel in a primary melting unit, such as, but not limited to, a basic oxygen furnace or an electric arc furnace, and secondary metallurgical vessels, such as, but not limited to, a ladle metallurgical furnace, a degasser, an argon oxygen decarburization vessel, or a vacuum oxygen decarburization vessel. These specific process requirements, aimed at achieving the required steel grade, have a demonstrated effect on refractory lining performance. The amount of residual carbon, the level of impurities and the addition of alloying elements are achieved by decarburization and deoxidation processes, having distinctive corrosion and erosion effect on refractories.

Further, for purposes of the discussion herein, "alloying additions" could include "deoxidizers" to furnaces or other metallurgical vessels, such as, but not limited to, aluminum, silicon, ferro-silicon, calcium, magnesium, calcium carbide, and various deoxidizing blends, or additions to ladle manufacturing vessels for secondary steelmaking and refining, such as, but not limited to, carbon, manganese, vanadium, molybdenum, chromium, nickel, titanium, boron, niobium, and other similar materials known to those having ordinary skill in the art.

The process of alloying steel is used to change the chemical composition of steel and alter, adjust, or improve its properties to suit a specification or application. The purpose of deoxidizers is to lower the concentration of oxygen in liquid steels. The additions are added by weight during the melting processes and refining processes, and they differ based on the starting and target parameters of each individual heat. The quantity and quality of these alloying additions have significant effect not only on the quality of the steel, but also on the corrosion of refractory linings.

Still moreover, for purposes of the discussion herein, "slag" could include solutions of molten metal oxides and fluorides floating on the top of liquid steel, and could be formed by materials such as, but not limited to, lime, dolomitic lime, and magnesia, which are added prior or during the steel-making and refining processes and are the basis for the creation of slags. Additionally, for purposes of the discussion herein, "flux additions" are added to optimize the fluidity of operating slags, and may include calcium aluminate, fluorspar, silica sand, or various blends of synthetic slags.

Slags are primarily liquid at the temperatures at which steel making and steel refining take place. They play a role in the steel making process, absorbing non-metallic compounds from the decarburization, deoxidation, desulfurization, and dephosphorization processes. The additions of slag former and fluxes could vary from heat to heat and can be as low as few pounds per ton of steel and as high as several hundred pounds per ton of steel. The quantity and the quality of these additions have a direct influence on the chemical composition of liquid slag and on the corrosion of refractory linings.

The typical chemical composition of the slags during the refining processes is identified in Table 1. An out-of-balance slag chemical composition has a significant negative impact on the life of a refractory lining. The chemical compositions of a processed cold sample can be measured by, for example, an XRF unit, thereby employing an x-ray fluorescence analytical technique to determine the chemical composition. While not discussed in detail below, a unit that can measure the chemical composition of a processed cold sample will be referred to as slag chemistry measurement apparatus 3.

TABLE 1

Ideal Vessel Slag Composition

| Component | Silicon Killed | Aluminum Killed |
|---|---|---|
| CaO | 50-60% | 50-60% |
| $SiO_2$ | 25-30% | <8% |
| MgO | 7-10% | 7-10% |
| $Al_2O_3$ | <8% | 25-30% |
| FeO + MnO | <2% | <2% |

The temperature of steel is defined as such prior to tapping (or removal) of the steel from the primary melter, i.e., the furnace vessel, in the range between 2800° F. and 3200° F., or during or near the end of secondary steelmaking in a ladle vessel in the range between 2700° F. and 3000° F. Temperature is usually measured by thermoelectric thermocouples with effectiveness within several degrees ° F., such as ladle thermocouple 25, which are dipped in the molten metal or molten steel and preferably expendable. The application of ladle thermocouple 25 in predictive refractory performance measurement system 4, as well as system 4 itself, will be described in further detail in the following discussion.

Additionally, for purposes of this discussion, a "history" of a metallurgical vessel refers to a period in which the same refractory lining has been lined over the inner surface of the outer wall of the metallurgical vessel. The history is typically recorded through the collection of various "ladle tracking parameters", which include, but are not limited to, heats, plate changes, nozzle changes, and other events that affect metallurgical vessels during the steel-making process in such a way that would affect the life span of refractory linings installed therein. More specifically, the ladle tracking parameters identify when the refractory lining of metallurgical vessel is subjected to repair, change, or demolition.

For example, newly installed working refractory lining of a metallurgical vessel, such as working refractory lining 34, has zero heats and has initial chemical compositions, origins, and physical designs. After service exposure, some of the components of the metallurgical vessel may require change or repair. Examples of such changes could be, but are not limited to a replacement of the flow control slide gate (after as low as 1 heat and as high as 15 heats), a replacement of flow control upper or lower nozzles (after as low as few heat up to 30 heats or higher), a replacement of a gas purging cone, a replacement of a well block and pocket blocks (as low as 15 heats and as high as life of the ladle), and a replacement of the slag line (as low as 15 heats and as high as the life of the unit).

There are additional repairs possible, such as, but not limited to, a monolithic patch of a bottom of a ladle vessel and a repair of the ladle vessel lip ring. The ladle vessel at a final demolition thereof could have exposed working refractory lining 34 to as low as a few heats and as high as greater than 200 heats. Variable ladle tracking parameters have significant effects on the overall performance of the refractory lining. The repairs or changes to the metallurgical vessel typically require the vessel to be taken out of service, thereby resulting in thermal shock or thermal gradient damage to the refractory lining positioned therein.

Still additionally, for purposes of this discussion, "preheating" refers to exposing a metallurgical vessel to a gas-powered preheater prior to exposure to molten metal or molten steel. Specifically, each empty metallurgical vessel, if in operation, should be kept hot. The preheating influences the performance of working refractory linings, such as working refractory lining 34. The preheating temperature may be measured by thermocouples, such as preheater thermocouple 2 described in further detail below, or optical pyrometers. The preheating temperatures are typically in a range of 1500° F. to 2200° F.

However, since working refractory linings, such as working refractory lining 34, usually contain graphite and carbon, any non-typical preheating exposure has direct impact on the carbon depletion and consequently on the performance of working refractory lining 34. While necessary, the preheating of working refractory linings, such as working refractory lining 34, predictably shortens the refractory life of the working refractory linings, which impacts the future status of the working refractory linings.

Further, the duration of the preheating is not predetermined. Instead, the duration is dependent upon the variables and circumstances defined in the area, or shop, in which the process takes place. Such variables and circumstances may include, but are not limited to, operational inconsistencies, process backlogs, availability of molten metal, unforeseen repairs, or emergency maintenance shutdowns of process equipment. As such, the duration of the preheating must be monitored by a recording mechanism, such as preheating recording apparatus 24, which is described in greater detail below.

Moreover, for the purposes of this discussion, "residence time" is defined as the cumulative contact time of working refractory lining 34 with molten steel and slags. The residence time is not predetermined and highly depends on the variables and circumstances defined in the area, or shop, in which the process takes place. For example, the process flow of the steel mill can affect the cumulative contact time of working refractory lining 34 with molten steel and slags from as low as 30 minutes to as high as 10 hours or more per each heat. As such, the cumulative contact time must be monitored by a recording mechanism, such as residence time recording apparatus 23, which is described in greater detail below.

Further, metallurgical vessels are typically equipped with stirring elements located in the bottom thereof. They purge inert gas, such as argon or nitrogen, thru molten steel. The main purpose of this is to improve and accelerate desulfurization of the molten steel, but also to improve alloying efficiency and temperature homogenization of the molten steel.

The stirring pressure is typically in the range of 120 psi to 180 psi, and the gas volume is typically between 5-50 scfm. The normal flow volumes are typically 5-10 scfm for a gentle stir and rinse, 15-25 scfm for a medium stir during arcing, alloy addition, and homogenization, and 25-45 scfm for heavy desulfurization. Flows vary by vessel size, plug location, and plug conditions. The purging duration during the heat could be in the range of a few minutes to 30 minutes or more. The typical life of the purging plug is between 500 minutes and 2,000 minutes.

The stirring pressure, flow, and time influence not only the life of the plug, but localized erosion of working refractory lining 34. Thus, as is the case with the preheating and the residence time, the parameters related to the stirring of the molten steel are not predetermined, but are dependent on the efficiency of the desulfurization of the steel. For example, the level of sulfur is measured prior to the tapping of the molten steel. If the target of desulfurization is not reached, additional stirring time, increased stirring pressure, and higher flowrate is applied. Increases and elevations in these parameters are known to result in a reduced life span of working refractory lining 34. These parameters can be monitored and recorded in gas stirring control apparatus 26, which will be discussed further below.

In addition, for purposes of this discussion, a physical orientation of a metallurgical vehicle corresponds with the position of the metallurgical vehicle in relationship to an overall space of the area in which the metallurgical vehicle is being used, such as a steel mill or any other facility dedicated to steel generation.

Referring now to the drawings, wherein the showing is for illustrating a preferred embodiment of the invention only and not for limiting same, the invention will be described with reference to FIGS. 1-3.

FIG. 1 is a schematic view illustrating an example of predictive refractory performance measurement system 4. System 4 is used to predict the future status, or performance, of refractory linings that are lined over inner surfaces of outer walls of metallurgical vessels for handling molten metal or molten steel. Predictive refractory performance measurement system 4 may be implemented in a mill, foundry, or other environments known by those of ordinary skill in the art to be suitable for the melting, forming, and refining of steel and metal. However, it is contemplated that a substantial portion of system 4 could be implemented in any environment in which surface analysis, temperature analysis, process data analysis, and life expectancy calculation are desired for refractories.

Figure 2:
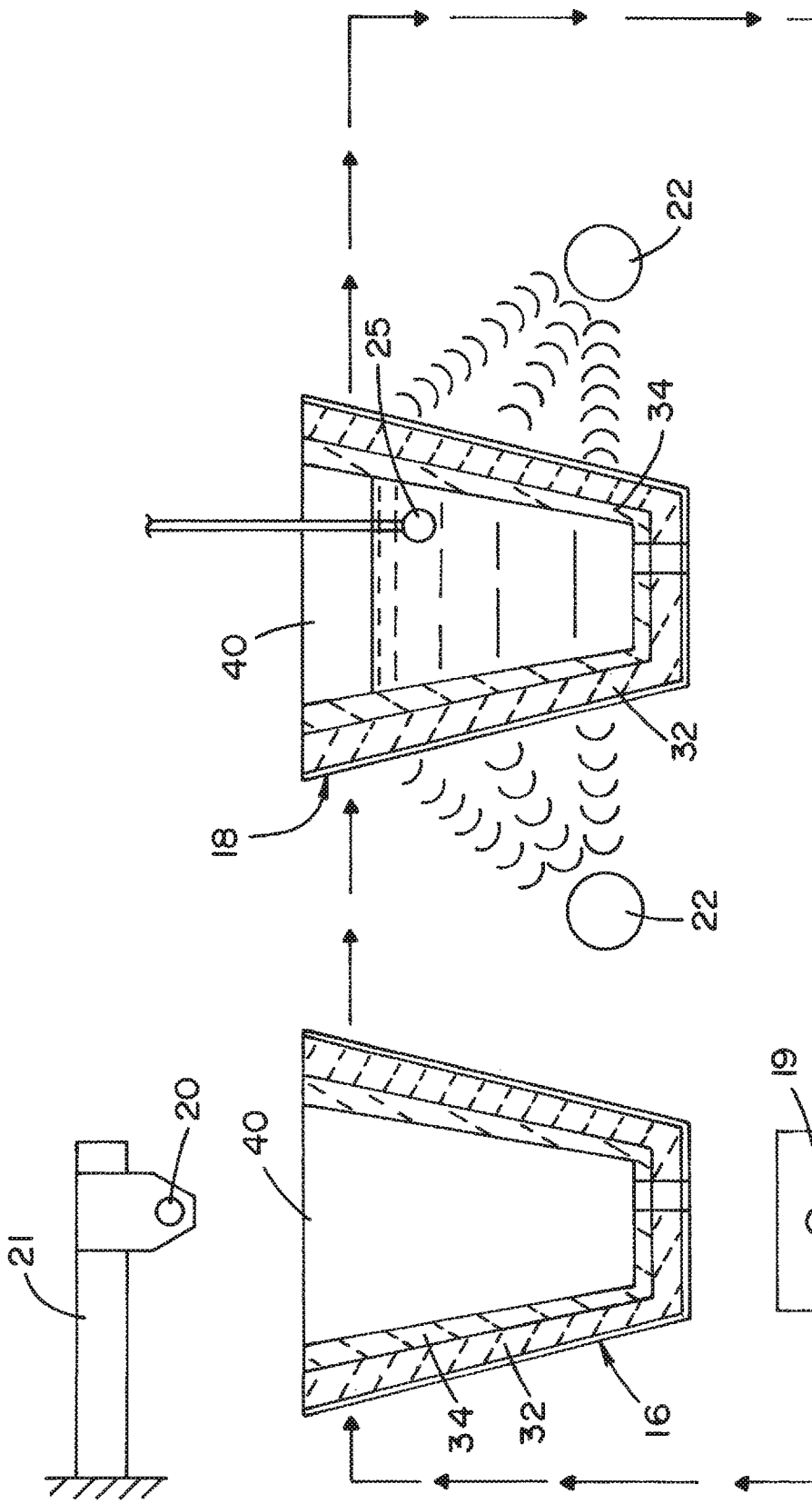
FIG. 2 is a schematic view illustrating examples of a refractory lining being respectively lined over an inner surface of an outer wall of an empty metallurgical vessel and a full metallurgical vessel for which a future status of the refractory lining is to be predicted by the predictive refractory performance measurement system of the present invention.
Figure 3:
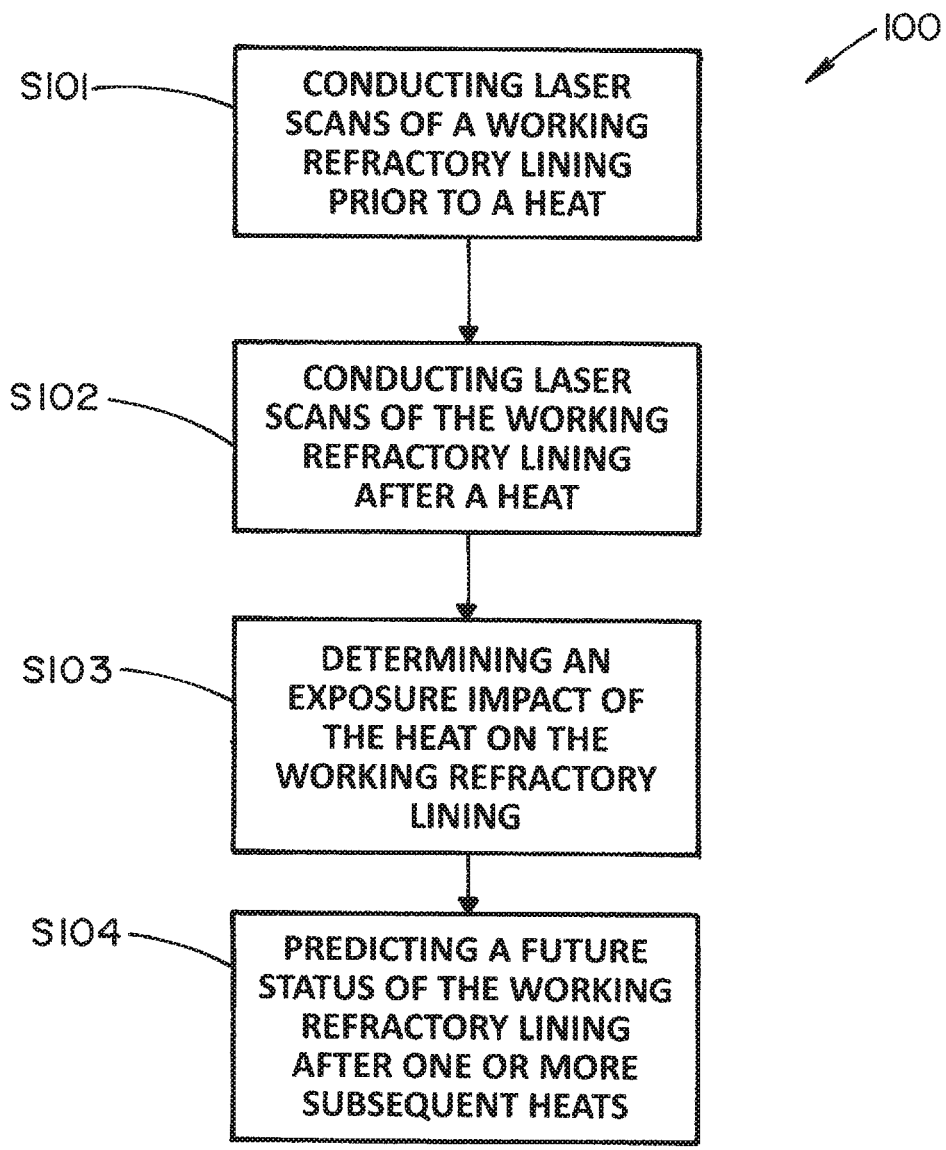
FIG. 3 is a flowchart illustrating an example method of the present invention of predicting a future status of a refractory lining that is lined over an inner surface of an outer wall of a ladle vessel and exposed to a heat during which the refractory lining is exposed to molten metal.

The example apparatuses, units, modules, devices, and other components illustrated in FIG. 1 that make up system 4 and perform the method and operations described herein with respect to FIGS. 2 and 3 are implemented by hardware components. Examples of hardware components are not limited to the above-described example apparatuses, units, modules, and devices and may include controllers, sensors, generators, drivers, and any other electronic components known to one of ordinary skill in the art. Such components may be variably located according to design needs and may communicate with each other through wired or wireless means.

In the non-limiting example described herein, system 4 includes computing complex 10. Computing complex 10 may include one or more processors 12 and one or more means of storage 14, but is not limited thereto. Processors 12 and storage 14 of computing complex 10 may be oriented, positioned, or connected in any way to facilitate proper operation of computing complex 10. This includes, but is not limited to, wired configurations, wireless configurations, local configurations, wide area configurations, and any combination thereof in which communication therebetween can be established through compatible network protocol.

Processor 12 is implemented by one or more processing elements. Such processing elements may be as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result.

For simplicity, the singular term "processor" may be used in the description of the example processor 12 described herein, but in other examples multiple processors 12 are used, or processor 12 includes multiple processing elements, or multiple types of processing elements, or both. In one example, system 4 of hardware components includes multiple processors 12 in computing complex 10, and in another example, a hardware component of system 4 includes an independent processor or another controller containing a processor, which then communicates data to receive data from processor 12 of computing complex 10. Processor 12 of computing complex 10 may be defined as a hardware component, along with other components of system 4 discussed below. Similar to processor 12 and other hardware components containing processing functionality may be defined according to any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. Processor 12 may be connected via cable or wireless network to hardware components to provide instruction thereto or to other processors to enable multiprocessing capabilities.

Instructions or software to control processor 12 or hardware including processors within system 4 to implement the hardware components and perform the methods as described below are written as computer programs, code segments, instructions or any combination thereof, for individually or collectively instructing or configuring processor 12 or hardware including processors within system 4 to operate as a machine or special-purpose computer to perform the operations performed by the hardware components and the methods as described below. In one example, the instructions or software include machine code that is directly executed by processor 12 or hardware including processors within system 4, such as machine code produced by a compiler. In another example, the instructions or software include higher-level code that is executed by processor 12 or hardware including processors within system 4 using an interpreter.

Programmers of ordinary skill in the art can readily write the instructions or software based on the flow chart illustrated in FIG. 3 and the corresponding descriptions herein, which disclose algorithms for performing the operations performed by the hardware components and the methods as described above.

Hardware components implemented in system 4, such as processor 12 or components linked to processor 12, execute instructions or software, such as an operating system (OS) and one or more software applications that run on the OS, to perform the operations described herebelow with respect to FIGS. 2 and 3.

The instructions or software to control processor 12 or hardware including processors within system 4 to implement the hardware components and perform the methods as described below, and any associated data, data files, and data structures, are recorded, stored, or fixed in storage 14. Storage 14 of computing complex 10 generically refers to one or more memories storing instructions or software that are executed by processor 12. However, the hardware components implemented in system 4, such as processor 12 or components linked to processor 12, may include local storage or access, manipulate, process, create, and store data in storage 14 in response to execution of the instructions or software.

Storage 14 may be represented by on one or more non-transitory computer-readable storage media. Storage 14 may be representative of multiple non-transitory computer-readable storage media linked together via a network of computing complex 10. For example, non-transitory computer-readable storage media may be located in one or more storage facilities or one or more data centers positioned remotely from system 4 within computing complex 10. Such a media may be connected to system 4 through a network of computing complex 10. The network of computing complex 10 allows the non-transitory computer-readable storage media remotely located at the data center or the storage facility to transfer data over the network to non-transitory computer-readable storage medium within storage 14 of computing complex 10. In addition, storage 14 may be representative of both remotely and locally positioned non-transitory computer-readable storage media.

Examples of a non-transitory computer-readable storage medium include read-only memory (ROM), random-access memory (RAM), flash memory, solid state memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to processor 12 of computing complex 10 or hardware including processors within system 4 so that processor 12 or processors can execute the instructions. In one example, the instructions or software and any associated data, data files, and data structures are distributed over network-coupled computer systems so that the instructions and software and any associated data, data files, and data structures are stored, accessed, and executed in a distributed fashion by processor 12.

Examples of hardware components in system 4 other than processor 12 and storage 14 of computing complex 10 may include terminal 6. Terminal 6 may include a user input, a display, or a combination thereof, but is not limited thereto. In FIG. 1, terminal 6 is illustrated as being connected to computing complex 10. However, embodiments disclosed herein are not limited thereto. For example, terminal 6 may be connected directly to processor 12, directly to storage 14, to both storage 14 and processor 12, or to any other hardware component of system 4.

Terminal 6 may be configured to display information contained in storage 14 that has been processed by processor 12 or inputted by a user. Processor 12 is in charge of determining what should be displayed on terminal 6. Storage 14 may be configured to store data generated by processor 12 and inputted through terminal 6. Applications, user input, and processor calculations may be stored in storage 14 for access by processor 12 in order to predict refractory performance.

Further examples of the above-referenced hardware in system 4 connected to storage 14 may also include slag chemistry measurement apparatus 3, laser scanner 20, preheater thermocouple 2, infrared cameras 22, residence time recording apparatus 23, preheating recording apparatus 24, gas stirring control apparatus 26, ladle thermocouple 25, and orientation laser 19. Storage 14 may receive data from these hardware components in any wired or wireless manner known to those having ordinary skill in the art and communicate the received and stored data to processor 12 in any wired or wireless manner known to those having ordinary skill in the art for further processing. These operational components will be more particularly described in the discussion below.

FIG. 2 is a schematic view illustrating an example refractory lining being lined over an inner surface of an outer wall of ladle vessels 16 and 18 for which a future status of the refractory lining is to be predicted by predictive refractory performance measurement system 4. Ladle vessel 16 does not contain molten metal or molten steel and, therefore, is referred to as "empty ladle vessel 16". Ladle vessel 18 contains molten metal or molten steel and, therefore, is referred to as "full ladle vessel 18". Ladle vessels 16 and 18 of FIG. 2 are representative of secondary refining and transport vessels, such as steel ladles.

Each of ladle vessels 16 and 18 are lined with the same refractory. In the examples illustrated in FIG. 2, backup refractory lining 32 is lined over an inner surface of an outer wall of ladle vessels 16 and 18. Working refractory lining 34 is lined over backup refractory lining 32.

Since working refractory lining 34 is lined over backup refractory lining 32, backup refractory lining 32 typically has a relatively long life span. For example, backup refractory lining 32 may be able to have a one-year lifespan. On the other hand, during steel-making heats, working refractory lining 34 is directly exposed to the molten metal or molten steel placed within ladle vessels 16 and 18. Thus, working refractory lining 34 typically has a much shorter life span. Depending on the severity of the steel-making processes employed during the heats, working refractory lining 34 may only last for 2 weeks. As such, while working refractory lining 34 of empty ladle vessel 16 is the same as working refractory lining 34 of full ladle vessel 18, it is assumed that, during the heats, working refractory lining 34 of full ladle vessel 18 will be affected by the molten metal or molten steel contained therein. Therefore, the structural condition of working refractory lining 34 in empty ladle vessel 16 prior to a heat being conducted may be significantly different from the structural condition of working refractory lining 34 in empty ladle vessel 16 after each heat is conducted.

As previously noted, system 4 includes at least one laser scanner 20. Laser scanner 20 may be stationary or mobile. Laser scanner 20 is configured to scan working refractory lining 34 of empty ladle vessel 16 before and after the heats of handling molten metal or molten steel. Laser scanner 20 may have a class 1 eye safe laser with the capability to scan with a frequency of 1,000,000 points in a second. Laser scanner 20 may also have a scanning speed of 20 seconds and a 1 to 2 mm accuracy.

Laser scanner 20 is supported by laser support apparatus 21. Laser support apparatus 21 may be a stationary support if laser scanner 20 is stationary or a mobile support if laser scanner 20 is mobile. If laser scanner 20 is mobile, laser support apparatus 21 may be any means of support known by those of ordinary skill in the art to be suitable for moving mobile laser scanner 30. If laser scanner 20 is stationary, laser support apparatus 21 may be any means of fixable support known by those of ordinary skill in the art to be suitable for fixing stationary laser scanner 20.

The functions of scanning performed by laser scanner 20 include, but are not limited to, collecting structural data related to observations of pre- and post-heat structural conditions of working refractory lining 34 in empty ladle vessel 16 respectively before and after heats in which empty ladle vessel 16 is filled with molten metal or molten steel, thereby becoming full ladle vessel 18. This data is provided to computing complex 10 for safekeeping in storage 14 and/or consideration by processor 12 regarding the structural conditions of working refractory lining 34.

System 4 also may include one or more infrared cameras 22 that may conduct one or more infrared scans of an outer surface of the outer wall of full ladle vessel 18 during the heat to collect data related to a temperature of the outer surface of the outer wall of full ladle vessel 18 during the heat.

In one example, infrared cameras 22 may be placed in several locations within the process mill to strategically measure the temperature of the outer surface of the outer wall of full ladle vessel 18 as full ladle vessel 18 moves from a location in which full ladle vessel 18 is filled with the molten steel to secondary steelmaking locations throughout the process mill, including locations in which refining takes place. In another example, infrared cameras 22 may be placed in a location within the process mill to strategically measure the temperature of the outer surface of the outer wall of empty ladle vessel 16 before and after the heats of handling molten metal or molten steel. Thermal discrepancies of empty ladle vessel 16 can be identified even when empty ladle vessel 16 is being preheated. The temperature data collected from infrared cameras 22 can be mapped to identify deteriorating portions of working refractory lining 34 by processor 12.

Infrared cameras 22 may be any infrared camera known to those having ordinary skill in the art to be appropriate to image an outer surface of an outer wall of a metallurgical vessel when charged with molten steel. The temperature data can be provided to computing complex 10 for safekeeping in storage 14 and/or consideration by processor 12 regarding the structural conditions of working refractory lining 34.

While an analysis utilizing ASTM 680-14 or heat transfer calculation software developed for refractory design may be used to calculate the temperature data of empty ladle vessel 16 or full ladle vessel 18 obtained by infrared cameras 22 in view of thermal resistivity and heat fluxes, embodiments disclosed herein are not limited thereto. For example, any software or method of analysis known to one having ordinary skill in the art to be able to calculate such temperature data can be utilized.

Further, the laser scanned data, the temperature data, or a combination thereof communicated to computing complex 10 for consideration by processor 12 can be additionally considered alongside of other measured and predetermined operational parameters stored in storage 14 that are awaiting communication to and consideration by processor 12. The measured operational parameters may be supplied to computer complex 10 for reference by processor 12 through previously discussed hardware means, including, but not limited to, slag chemistry measurement apparatus 3, preheater thermocouple 2, residence time recording apparatus 23, preheating recording apparatus 24, gas stirring control apparatus 26, and ladle thermocouple 25. The predetermined operational parameters may be supplied to computer complex 10 through terminal 6 via user input or historical data previously processed by processor 12 and stored in storage 14 for future reference regarding the future status prediction for working refractory lining 34.

Predetermined operational parameters may include, but are not limited to, historical data related to one or more refractories applied in one or more historical refractory linings lined over inner surfaces of outer walls of historical metallurgical vessels that handled molten metal or molten steel, an initial chemical composition and origin of working refractory lining 34, an initial physical design of working refractory lining 34, a grade of the steel that is desired to be produced during the heat from the molten steel in the metallurgical vessel, physical and chemical attributes and amounts of charging mix components added to the metallurgical vessel during the heat to produce the desired steel grade from the molten steel, physical and chemical attributes and amounts of alloys added to the metallurgical vessel during the heat for secondary steelmaking and refining, physical and chemical attributes and amounts of slag formers added to the molten steel in the metallurgical vessel during the heat to form slags that absorb non-metallic components from the molten steel to produce the desired steel grade from the molten steel, physical and chemical attributes and amounts of flux additives added to the molten steel in the metallurgical vessel to optimize fluidity of the formed slags to produce the desired steel grade from the molten steel, a history of the metallurgical vessel during a period in which working refractory lining 34 has been lined over the liner surface of the outer wall of the metallurgical vessel, or any other relevant predetermined operational parameter identified in a specific metal producing operation.

For purposes of this application, the physical design of working refractory lining 34 may include, but is not limited to, construction details of working refractory lining 34, shapes of refractory components in working refractory lining 34, sizes of refractory components in working refractory lining 34, and combination of refractory components in working refractory lining 34.

Measured operational parameters may include, but are not limited to, a preheating duration during which the metallurgical vessel is empty and being preheated prior to the heat, a residence time defined by the cumulative contact duration during which the molten steel, the slags, or a combination thereof are in contract with working refractory lining 34 during the process to produce the molten steel, an amount of stirring pressure applied by a stirring of the molten steel in the metallurgical vessel, a flow rate of inert gas applied to the molten steel in the metallurgical vessel during the stirring of the molten steel in the metallurgical vessel, a stirring duration during which the molten metal is stirred, or any other relevant measured operational parameter identified in a specific metal producing operation.

Using the above-referenced data, processor 12 may determine an exposure impact that the heat has had on working refractory lining 34 of the metallurgical vessel and predict a future status of working refractory lining 34 after one or more subsequent heats. The exposure impact that the heat has on working refractory lining 34 may be determined by comparing the structural conditions of working refractory lining 34 before the heat with the structural conditions of working refractory lining 34 after the heat. The future status of working refractory lining 34 after one or more subsequent heats is predicted based on the determined exposure impact. In other words, the exposure impact of the initial heat can be used to predict the future status of working refractory lining 34 after a second heat, a third heat, and so on. Processor 12 may consider data from all data sources referenced above, but is not limited to thereto and could conceivably include other data sources not mentioned herein.

In one example, in order to supplement the prediction of the future status of working refractory lining 34, the determination of the exposure impact of working refractory lining 34 may also be supplemented by correlating the collected temperature data from infrared cameras 22 with the structural conditions of working refractory lining 34 before the handling of the molten steel and the structural conditions of working refractory lining 34 after the handling of the molten steel. This may allow the future status to be more accurately predicted.

In another example, in order to supplement the prediction of the future status of working refractory lining 34, the determination of the exposure impact of working refractory lining 34 may also be supplemented by considering, in correlation with the collected structural condition data, an operational impact that one or more of the aforementioned predetermined or measured operational parameters have on the exposure impact of the heat on working refractory lining 34.

In one example, the historical data related to one or more refractories applied in one or more historical refractory linings lined over inner surfaces of outer walls of historical metallurgical vessels that handled molten metal or molten steel may be used to establish historical patterns of exposure impact. Such historical patterns may complement the comparison of the structural conditions of working refractory lining 34 before the handling of the molten metal or molten steel with the structural conditions of working refractory lining 34 after the handling of the molten metal or molten steel, as well as the correlation of the collected temperature data from infrared cameras 22 therewith. Such historical data could be amassed in storage 14 of computer complex 10 after exposure impact determination to enable processor 12 to predict the future status of subsequent working refractory linings after each successive heat with more accuracy.

With respect to the use of the measured operational parameters to assist in determination of the exposure impact, ladle thermocouple 25 can be provided to measure a temperature of the molten metal or molten steel in full ladle vessel 18. In one example, ladle thermocouple 25 may be inserted through aperture 40 of full ladle vessel 18 and into molten steel to measure the temperature of the molten steel during or at the end of the secondary steelmaking process (e.g., the end of the refining process). Ladle thermocouple 25 may provide the measured temperature data to computing complex 10 for considering by processor 12 during the determination of the exposure impact pursuant to the prediction of the future status of working refractory lining 34.

In addition, slag chemistry measurement apparatus 3 may be provided to measure a chemical composition of a slag generated in a metallurgical vessel during the secondary steelmaking process. As previously noted, for measurement of the chemical composition, a sample of the slag must be cooled. Slag chemistry measurement apparatus 3 may be, for example, an XRF unit, thereby employing an x-ray fluorescence analytical technique to determine the chemical composition. Slag chemistry measurement apparatus 3 may provide the measured chemical composition of a slag to computing complex 10 for consideration by processor 12 during the determination of the exposure impact pursuant to the prediction of the future status of working refractory lining 34.

Moreover, preheater thermocouple 2 may be provided to measure a temperature of the metallurgical vessel when the metallurgical vessel is empty and being preheated prior to the metallurgical vessel being filled of the molten metal or molten steel. Preheater thermocouple 2 may provide the measured preheater temperature to computing complex 10 for consideration by processor 12 during the determination of the exposure impact pursuant to the prediction of the future status of working refractory lining 34.

To monitor the residence time duration, a recording mechanism, such as residence time recording apparatus 23 featured herein, may be used to measure the cumulative contact duration during which the molten metal, slags, or a combination thereof are in contact with the refractory lining during a heat.

In addition, to monitor the duration of the preheating, a recording mechanism, such as preheating recording apparatus 24 featured herein, may be used to record the duration of the preheating performed on an empty metallurgical vessel prior to a heat. Specifically, the duration of the preheating could be measured by preheating recording apparatus 24 as being as little as a few minutes and as great as several days. Preheating recording apparatus 24 may be included in a gas-powered preheater, along with an automatic gas shut-off.

Further, a control mechanism, such as gas stirring control apparatus 26, may be used to measure various stirring parameters, including, but not limited to, an amount of stirring pressure applied by a stirring of the molten steel in a full metallurgical vessel, a flow rate of inert gas applied to the molten steel in the full metallurgical vessel during the stirring of the molten steel in the full metallurgical vessel, and a stirring duration during which the molten metal is stirred.

Orientation laser 19 can be provided to scan the empty ladle vessel 16 to identify a physical orientation of the empty ladle vessel 16 prior to the laser scanning of working refractory lining 34 by laser scanner 20. The scanning performed by orientation laser 19 serves to assist and increase the accuracy of the laser scanning of working refractory lining 34 performed by laser scanner 20. The physical orientation of the empty ladle vessel 16 relates to the position of empty ladle vessel 16 with respect to the process or facility in which empty ladle vessel 16 is being used. Orientation laser 19 provides the identified physical orientation of the metallurgical vessel to computing complex 10 for consideration by processor 12 to determine correct positioning of empty ladle vessel 16 for accurate determination of the exposure impact pursuant to the prediction of the future status of working refractory lining 34.

More particularly, data from orientation laser 19 may allow processor 12 to determine thickness measurements from spatial measurements of the surface of working refractory lining 34. Such measurements cannot be derived unless the physical location and orientation of empty ladle vessel 16 is assumed or precisely known. Data from orientation laser 19 may allow processor 12 to precisely know the physical location and orientation of empty ladle vessel 16.

While orientation laser 19 is shown in FIG. 2 to be positioned directly under empty ladle vessel 16, embodiments disclosed herein are not limited thereto. For example, orientation laser 19 can be positioned in any safe and unobstructed placed with a direct visibility of the outer wall of empty ladle vessel 16, so that orientation laser 19 might be positioned to scan the bottom and the lower portion of empty ladle vessel 16. It is also noted that physical orientation identification by orientation laser 19 can be supplemented through the data provided by laser scanner 20 regarding empty ladle vessel 16.

Referring now to FIGS. 2 and 3, method 100 of predicting a future status of working refractory lining 34 that is lined over an inner surface of an outer wall of a metallurgical vessel and exposed to a heat during which the refractory lining is exposed to molten metal or molten steel is described.

For purposes of discussion of method 100, "metallurgical vessel" may refer to a ladle vessel that is exposed to molten metal or molten steel. A ladle vessel in method 100 refers generally to empty ladle vessel 16 and full ladle vessel 18 in situations in which the emptiness or the fullness of the ladle vessel is not at issue. In addition, in one example, empty ladle vessel 16 receives molten steel from a furnace when molten steel is tapped therefrom. As such, empty ladle vessel 16 transitions to full ladle vessel 18 when molten steel is tapped from the furnace into empty ladle vessel 16.

Moreover, while method 100 is not limited to processes in which a metallurgical vessel is transported, it is assumed that, during a heat in method 100, ladle vessels 16 and 18 are transported throughout the process location or mill through transport means known to those having ordinary skill in the art, such as, but not limited to, cranes, conveyors, rails, and bearings. Further, computing complex 10, including processor 12 and any other control unit contained therein, is enabled to control all processes, including, but not limited to, scanning, measuring, transporting, transferring of metals, observing, collecting, determining, predicting, and considering.

A schematic illustration of the transportation of ladle vessel 16 and 18 is illustrated in FIG. 2. Empty ladle vessel 16 and full ladle vessel 18 are illustrated separately. In an example, empty ladle vessel 16 may be initially scanned to identify a physical orientation of empty ladle vessel 16 prior to any scanning of working refractory lining 34. Such an initial scan may be performed by orientation laser 19, which was discussed above. The physical orientation of empty ladle vessel 16 may be taken into account by processor 12 during any further considerations, determinations, and predictions by processor 12 with respect to ladle vessels 16 or 18.

In addition, after physical orientation scanning and prior to any scanning of working refractory lining 34, while empty ladle vessel 16 is being preheated in preparation for a heat, a preheating temperature and a preheating duration during which empty ladle vessel 16 is being preheated prior to the heat may be recorded. The preheating temperature may be measured by preheater thermocouple 2, and the preheating duration may be recorded by preheating recording apparatus 24. The preheating temperature and the preheating duration may be used by processor 12 as measured parameters in considering an operational impact that the operational parameters related to the steelmaking have on the structural conditions of working refractory lining 34 after the handling of the molten metal or molten steel.

Further measurement of operational parameters, such as, but not limited to, a measurement of temperature of the molten metal or molten steel in full ladle vessel 18 by ladle thermocouple 25, a measurement of a chemical composition of a slag in full ladle vessel 18 by slag chemistry measurement apparatus 3, a measurement of the cumulative contact duration during which the molten steel, the slags, or a combination thereof are in contract with working refractory lining 34 during the heat by residence time recording apparatus 23, and a measurement of a variety of stirring parameters by gas stirring control apparatus 26, may be performed during a heat and will be described in detail below. Predetermined operational parameters, as described above, may be provided to computing complex 10 when convenient. However, as has previously been noted and will be described further below, any predetermined operational parameters provided to computing complex 10 will be considered by processor 12 in the determination of the exposure impact on working refractory lining 34.

After any additional preparative steps are completed, prior to a heat, a laser scan of working refractory lining 34 of empty ladle vessel 16 is conducted (S101). The conducting of the laser scan prior to the heat may be performed by laser scanner 20. The conducting of the laser scan prior to the heat may also include the collecting of data related to pre-heat structural conditions of working refractory lining 34.

Then, a heat is performed, during which empty ladle vessel 16 is filled with molten metal or molten steel, thus becoming full ladle vessel 18. This is illustrated in the flow of FIG. 2, where empty ladle vessel 16 is illustrated at one portion of the process and full ladle vessel 18 is illustrated at a later point in the process. During the heat, full ladle vessel 18 is emptied and becomes empty ladle vessel 16, as is illustrated by the flow in FIG. 2.

After the heat is completed, another laser scan of working refractory lining 34 of empty ladle vessel 16 is conducted (S102). Similar to the conducting of the laser scan prior to the heat, the conducting of the laser scan after the heat may be performed by laser scanner 20. Further, the conducting of the laser scan after the heat may also include the collecting of data related to post-heat structural conditions of working refractory lining 34.

After the laser scanning prior to the heat and the laser scanning after the heat, processor 12 determines (S103) an exposure impact of the heat on working refractory lining 34. Processor 12 may determine the exposure impact by comparing the collected pre-heat structural condition data with the collected post-heat structural condition data. After the determination of the exposure impact of the heat, processor 12 predicts (S104) the future status of working refractory lining 34 after one or more subsequent heats based on the determination of the exposure impact of the heat.

This prediction provides information that is crucial to determine whether the ladle vessel can be used again with working refractory lining 34 or if working refractory lining 34 needs replaced. As such, accidents that result in excessive structural damage to the ladle vessel can be avoided, resulting in less down time, greater efficiency, and cost savings.

In one example, during the heat, one or more infrared scans of the outer surface of the outer wall of full ladle vessel 18 may be conducted by infrared cameras 22. The scans enable infrared cameras 22 to collect data related to the temperature of the outer surface detected during the heat. This temperature data may be correlated with the collected structural condition data to more accurately determine the exposure impact and predict the future status.

In another example, the determining of the exposure impact includes considering, in correlation with the collected structural condition data and, optionally, in this particular example, the collected temperature data from the infrared scanning, an operational impact that one or more of the measured or predetermined operational parameters have on working refractory lining 34 during the heat.

The predetermined operational parameters include those predetermined operational parameters previously discussed herein, including, but not limited to, historical data related to one or more refractories applied in one or more historical refractory linings that handled molten metal, an initial chemical composition and origin of working refractory lining 34, an initial design of working refractory lining 34, a grade of steel that is desired to be produced during the heat, physical and chemical attributes and amounts of charging mix components added to full ladle vessel 18 during the heat, physical and chemical attributes and amounts of alloys added to full ladle vessel 18 during the heat, physical and chemical attributes and amounts of slag formers added to full ladle vessel 18 during the heat, physical and chemical attributes and amounts of flux additives added to full ladle vessel 18 during the heat, and a history of ladle vessel 16 and 18 during a period in which working refractory lining 34 has been lined therein.

The measured operational parameters include those measured operational parameters previously discussed herein, including, but not limited to, a preheating temperature during which empty ladle vessel 16 is being preheated prior to the heat measured by preheater thermocouple 2, a preheating duration during which empty ladle vessel 16 is being preheated prior to the heat measured by preheating recording apparatus 24, a measurement of temperature of the molten metal or molten steel in full ladle vessel 18 by ladle thermocouple 25, a measurement of the cumulative contact duration during which the molten steel, the slags, or a combination thereof are in contract with working refractory lining 34 during the heat by residence time recording apparatus 23, and a measurement, by gas stirring control apparatus 26, of a variety of stirring parameters, such as, but not limited to, an amount of stirring pressure applied by a stirring of the molten metal in full ladle vessel 18 during the heat, a flow rate of inert gas applied to the molten metal in full ladle vessel 18 during the stirring, and a stirring duration during which the molten metal is stirred.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A measurement system for predicting a future status of a refractory lining that is lined over an inner surface of an outer wall of a metallurgical vessel and exposed to a heat during which the refractory lining is exposed to molten metal, the system comprising:
   one or more laser scanners configured to conduct a plurality of laser scans of the refractory lining when the metallurgical vessel is empty, at least one of the laser scanners being further configured to laser scan the refractory lining prior to the heat to collect data related to pre-heat structural conditions of the refractory lining, at least one of the laser scanners being further configured to laser scan the refractory lining after the heat to collect data related to post-heat structural conditions of the refractory lining; and
   a processor configured to:
      determine an exposure impact of the heat on the refractory lining by comparing the collected pre-heat structural condition data with the collected post-heat structural condition data; and
      predict the future status of the refractory lining after one or more subsequent heats based on the determined exposure impact of the heat.

2. The system according to claim 1, further comprising:
   one or more infrared cameras configured to conduct one or more infrared scans of an outer surface of the outer wall of the metallurgical vessel during the heat when the metallurgical vessel is full of the molten metal to collect data related to a temperature of the outer surface during the heat,
   wherein the processor is further configured to determine the exposure impact by correlating the collected temperature data with the collected structural condition data.

3. The system according to claim 2, wherein the processor is further configured to map the collected temperature data to identify deteriorating portions of the refractory lining.

4. The system according to claim 1, wherein the processor is further configured to determine the exposure impact by considering, in correlation with the collected structural condition data, an operational impact that one or more operational parameters have on the refractory lining during the heat.

5. The system according to claim 4, wherein the operational parameters include historical data related to one or more refractories applied in one or more historical refractory linings that handled molten metal.

6. The system according to claim 4, wherein the operational parameters include one or more predetermined operational parameters selected from the group consisting of:
   historical data related to one or more refractories applied in one or more historical refractory linings that handled molten metal;
   an initial chemical composition and origin of the refractory lining;
   an initial refractory lining physical design;
   a grade of steel that is desired to be produced during the heat;
   physical and chemical attributes and amounts of charging mix components added to the metallurgical vessel during the heat;
   physical and chemical attributes and amounts of alloys added to the metallurgical vessel during the heat;
   physical and chemical attributes and amounts of slag formers added to the metallurgical vessel during the heat;
   physical and chemical attributes and amounts of flux additives added to the metallurgical vessel during the heat; and
   a history of the metallurgical vessel during a period in which the refractory lining has been lined over the inner surface of the outer wall of the metallurgical vessel.

7. The system according to claim 4, further comprising:
   a preheating recording apparatus configured to measure a preheating duration during which the metallurgical vessel is empty and being preheated prior to the heat, the preheating duration being one of the operational parameters.

8. The system according to claim 4, further comprising:
   a residence time recording apparatus configured to measure a cumulative contact duration during which the molten metal, slags, or a combination thereof are in contact with the refractory lining during the heat, the cumulative contact duration being one of the operational parameters.

9. The system according to claim 4, further comprising:
   a gas stirring control apparatus configured to measure one or more stirring parameters, the stirring parameters comprising:
      an amount of stirring pressure applied by a stirring of the molten metal in the metallurgical vessel during the heat;
      a flow rate of inert gas applied to the molten metal in the metallurgical vessel during the stirring, and;
      a stirring duration during which the molten metal is stirred,
   wherein the operational parameters comprise the stirring parameters.

10. The system according to claim 4, further comprising:
    one or more process thermocouples configured to measure a temperature of the molten metal in the metallurgical vessel during the heat, the measured temperature being one of the operational parameters.

11. The system according to claim 4, further comprising:
    a slag chemistry measurement apparatus configured to measure a chemical composition of a slag generated in the metallurgical vessel during the heat, the chemical composition of the slag being one of the operational parameters.

12. The system according to claim 4, further comprising:
    a preheater thermocouple configured to measure a preheating temperature of the metallurgical vessel when the metallurgical vessel is empty and being preheated in preparation for the heat, the preheating temperature of the metallurgical vessel being one of the operational parameters.

13. The system according to claim 4, further comprising:
    one or more infrared cameras configured to conduct one or more infrared scans of an outer surface of the outer wall of the metallurgical vessel during the heat when the metallurgical vessel is full of the molten metal to collect data related to a temperature of the outer surface during the heat,
    wherein the processor is further configured to determine the exposure impact by correlating the collected temperature data with the collected structural condition data and the operational impact of the operational parameters.

14. The system according to claim 1, further comprising:
    an orientation laser configured to scan the metallurgical vessel to identify a physical location and orientation of the metallurgical vessel prior to the heat.

15. A method of predicting a future status of a refractory lining that is lined over an inner surface of an outer wall of a metallurgical vessel and exposed to a heat during which the refractory lining is exposed to molten metal, the method comprising:
    conducting one or more laser scans of the refractory lining prior to the heat, the conducting prior to the heat comprising collecting data related to pre-heat structural conditions of the refractory lining;
    conducting one or more laser scans of the refractory lining after the heat, the conducting after the heat comprising collecting data related to post-heat structural conditions of the refractory lining;
    determining, via a processor, an exposure impact of the heat on the refractory lining, the determining comprising comparing the collected pre-heat structural condition data with the collected post-heat structural condition data; and
    predicting, via the processor, the future status of the refractory lining after one or more subsequent heats based on the determining of the exposure impact of the heat.

16. The method according to claim 15, further comprising:
    conducting one or more infrared scans of an outer surface of the outer wall of the metallurgical vessel during the heat when the metallurgical vessel is full of the molten metal, the conducting during the heat comprising collecting data related to a temperature of the outer surface detected during the heat,
    wherein the determining of the exposure impact further comprises correlating the collected temperature data with the collected structural condition data.

17. The method according to claim 15, wherein the determining of the exposure impact further comprises considering, in correlation with the collected structural condition data, an operational impact that one or more operational parameters have on the refractory lining during the heat.

18. The method according to claim 17, wherein the operational parameters include historical data related to one or more refractories applied in one or more historical refractory linings that handled molten metal.

19. The method according to claim 17, wherein the operational parameters include one or more predetermined operational parameters selected from the group consisting of:
    historical data related to one or more refractories applied in one or more historical refractory linings that handled molten metal;
    an initial chemical composition and origin of the refractory lining;
    an initial refractory lining physical design;
    a grade of steel that is desired to be produced during the heat;
    physical and chemical attributes and amounts of charging mix components added to the metallurgical vessel during the heat;
    physical and chemical attributes and amounts of alloys added to the metallurgical vessel during the heat;
    physical and chemical attributes and amounts of slag formers added to the metallurgical vessel during the heat;
    physical and chemical attributes and amounts of flux additives added to the metallurgical vessel during the heat; and
    a history of the metallurgical vessel during a period in which the refractory lining has been lined over the inner surface of the outer wall of the metallurgical vessel.

20. The method according to claim 17, further comprising:
    measuring a preheating duration during which the metallurgical vessel is empty and being preheated prior to the heat, the preheating duration being one of the operational parameters.

21. The method according to claim 17, further comprising:
    measuring a cumulative contact duration during which the molten metal, slags, or a combination thereof are in contact with the refractory lining during the heat, the cumulative contact duration being one of the operational parameters.

22. The method according to claim 17, further comprising:
    measuring one or more stirring parameters, the stirring parameters comprising:
        an amount of stirring pressure applied by a stirring of the molten metal in the metallurgical vessel during the heat;
        a flow rate of inert gas applied to the molten metal in the metallurgical vessel during the stirring, and;
        a stirring duration during which the molten metal is stirred,
    wherein the operational parameters comprise the stirring parameters.

23. The method according to claim 17, further comprising:
    measuring a temperature of the molten metal in the metallurgical vessel during the heat, the measured temperature being one of the operational parameters.

24. The method according to claim 17, further comprising:
    measuring a chemical composition of a slag generated in the metallurgical vessel during the heat, the chemical composition of the slag being one of the operational parameters.

25. The method according to claim 17, further comprising:
    measuring a preheating temperature of the metallurgical vessel when the metallurgical vessel is empty and being preheated in preparation for the heat, the preheating temperature of the metallurgical vessel being one of the operational parameters.

26. The method according to claim 17, further comprising:
    conducting one or more infrared scans of an outer surface of the outer wall of the metallurgical vessel during the heat when the metallurgical vessel is full of the molten metal, the conducting during the heat comprising collecting data related to a temperature of the outer surface detected during the heat,
    wherein the determining of the exposure impact further comprises correlating the collected temperature data with the collected structural condition data and the operational impact of the operational parameters.

* * * * *